Figure 1:
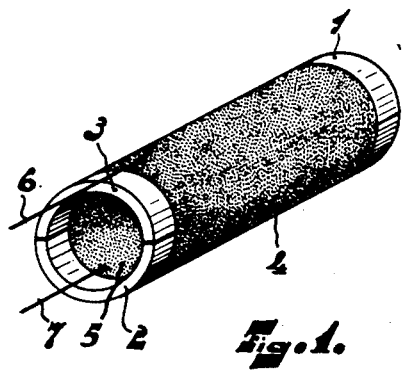

June 16, 1953  R. D. BUGEL ET AL  2,642,476
COMBINATION OF AT LEAST TWO CONDENSERS
ELECTRICALLY CONNECTED IN PARALLEL
Filed Aug. 4, 1948

ROELOF DIRK BUGEL
GERARD HEINRICH JONKER
JAN HEINRIK VAN SANTEN
INVENTORS

BY Fred M Vogel
AGENT

Patented June 16, 1953

2,642,476

UNITED STATES PATENT OFFICE 2,642,476

COMBINATION OF AT LEAST TWO CONDENSERS ELECTRICALLY CONNECTED IN PARALLEL

Roelof Dirk Bügel, Gerard Heinrich Jonker, and Jan Heinrik van Santen, Eindhoven, Netherlands, assignors to Hartford National Bank and Trust Company, Hartford, Conn., as trustee Application August 4, 1948, Serial No. 42,496
In the Netherlands August 12, 1947

5 Claims. (Cl. 175—41)

Several dielectrics, inter alia materials with a base of titanates of perovskite structure, are known which, although each in a greatly restricted temperature range, exhibit a high dielectric constant which may be 3000 or even more.

The curves which for these substances indicate the relationship between the dielectric constant $\epsilon$ and the temperature T exhibit a pronounced maximum value and, on either side of this maximum value, have a comparatively steep slope. The temperature at which this maximum value occurs varies with the nature of the substance; for barium titanate, for example, it is at approximately 127° C., but for strontium titanate this maximum value lies in the proximity of the absolute zero point.

It has been known before that a mixed crystal can be obtained from two of these substances, which crystal, similar to its component ingredients, exhibits, at a definite temperature, a sharp and high maximum value of the $\epsilon$. The temperature at which this maximum value occurs is comprised between the temperatures at which the maximum values lie for each of the constituents and is determined by the ratio between these substances in the mixed crystal. By varying the ratio a shift of the maximum value of the $\epsilon$ to a different temperature may be obtained.

Where a high variation of the capacity with temperature was unwanted, the use of condensers having a dielectric as above referred to had to be restricted to a temperature range below the temperature at which the maximum of the $\epsilon$ of the di-electric occurs, because here most of these substances exhibit an $\epsilon$ which varies comparatively little with temperature and the value of which, though materially lower than the maximum value, exceeds that of other known dielectrics.

The invention has for its object to utilize the extremely high value of the $\epsilon$ and tends to enlarge the comparatively small temperature range in which it occurs.

According to the invention, in a combination of two or more condensers electrically connected in parallel, at least two of them comprise a dielectric the dielectric constant of which, as a function of temperature, exhibits a pronounced maximum value which lies at a differing temperature.

It should be noted that it is known that by electric parallel connection of two of more condensers, a combination is obtainable, which, in certain respects, exhibits more favourable properties than a single one of the condensers used in the combination. Thus, it has been suggested that by parallel combination of two condensers of which one exhibits a negative, the other a positive temperature coefficient of the capacity, a combination should be formed, the capacity of which exhibits a smaller temperature coefficient than that of one of the parallel-connected condensers. However, in the known combinations no use has hitherto been made of condensers, the dielectric of which exhibits a high maximum value of the dielectric constant. It is surprising to find that by using in the combination condensers exhibiting such a dielectric, the extremely high value of the dielectric constant may be utilized; this was hitherto considered to be possible only for condensers kept at a constant temperature.

The use of dielectrics, of which the peaks of $\epsilon$-T-curve lie at different temperatures, ensures that the capacity of this combination varies slightly in a temperature range which comprises these peaks. The value of the variation depends on the relative position of the temperatures at which the peaks for the various dielectrics occur. The temperature range within which the effect aimed at by the combination according to the invention is obtained may be widened by using dielectrics, of which the temperatures at which the extremely high $\epsilon$ occurs are spaced further apart. As set out above the position of the maximum value in the $\epsilon$-T-curve is controllable by forming mixed crystals. As an alternative, widening of the temperature range may be obtained by increasing the number of condensers the capacity value of which varies with temperature.

A suitable choice of the number and the size of the dielectrics and of the position of the peaks in the $\epsilon$-T-curves thereof ensures the obtainment of a combination of condensers which satisfies particular requirements as to the temperature range within which the combination is required to be used and as to the permissible variations in capacity value of the combination within this temperature range.

For minimizing the said variation in capacity value of the combination, it is advantageous to proportion the dielectrics of the condensers such that at each of the temperatures at which at least one dielectric exhibits a peak in the $\epsilon$-T-curve the total capacity value of those condensers in the combination which at this temperature have a maximum capacity, is identical. If only one of the condensers in the combination exhibits a maximum capacity for each temperature, this involves that the condensers are chosen to be such that their maximum capacity values are equal.

The combination according to the invention may be realized by interconnecting the condensers in such manner that they are electrically connected in parallel; in a preferred embodiment the condensers are also combined from a spatial point of view, so that structurally they constitute a condenser battery.

In a preferred form of the combination according to the invention the dielectrics, which may be, say, plate-shaped or tubular, form a single unit, so that the dielectrics and the electrodes mounted on them structurally form a single condenser. The dielectrics may be united to form, say, a tubular body, the outer wall and inner wall respectively of which are covered by the electrodes. Each of the dielectrics may constitute a tube portion running the length of the tube, but, as an alternative, the dielectrics may be tubular and be arranged so as to be in sequence in the direction of their length, thus forming a unitary piece.

In the case of plate-shaped dielectrics a combination according to the invention, in which the dielectrics form a single unit, may be realized by arranging these dielectrics side by side so as to have their edges in contact and assembling them to form a single flat plate and mounting the electrodes on the upper and lower surfaces of the plate, or else by piling the dielectrics with the interposition of the electrodes and electrically interconnecting every alternate electrode.

Figure 2:
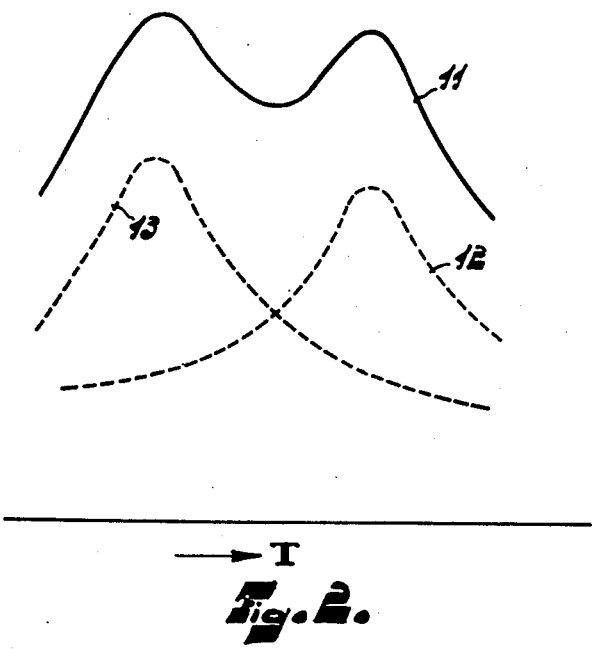

In order that the invention may be more clearly understood and readily carried into effect, it will now be described more fully with reference to the accompanying drawing, in which Fig. 1 shows one form of condenser combination according to the invention, and Fig. 2 illustrates the relationship between the capacity value of such a combination and the temperature.

The tubular, dielectric body 1 of the condenser combination shown in Fig. 1 comprises two axially extending dielectrics 2 and 3. The outer and the inner walls of the tube 1 have applied to them conductive coatings 4 and 5 respectively, to which supply conductors 6 and 7 are secured. Each of the dielectrics 2 and 3 and the parts of the coatings 4 and 5 applied thereto, form a condenser, these condensers being electrically connected in parallel in the combination.

The dielectric 2 equally well as the dielectric 3 primarily consists of a barium-strontium titanate mixed crystal, the ratio between the quantities of barium and strontium being in the former 90:10 and in the latter 75:25.

The dielectric constant of the dielectric 2 assumes a maximum value at about 35° C., whereas the dielectric constant of the dielectric 3 exhibits a distinct maximum value at about 77° C.

Fig. 2 diagrammatically shows the relationship between the various capacities and temperature.

Curve 11 shows the capacity variation of the combination with temperature, whereas curves 12 and 13 illustrate the relationship between the capacity of the condenser formed by dielectric 2 alone and of that formed by dielectric 3 alone respectively and temperature. It is clearly shown in this figure that owing to the parallel-combination of the condensers, the capacity of the combination assumes a high value in a considerably wider temperature range than does a condenser comprising a dielectric, the composition of which corresponds either to that of the dielectric 2 or to that of the dielectric 3.

What we claim is:

1. A capacitor assembly comprising two capacitors electrically connected in parallel, each of said capacitors comprising a pair of electrodes and a dielectric therebetween consisting of a titanate of an alkaline earth metal exhibiting a perovskite structure, said dielectrics each having different peak-dielectric constant temperatures within a given range of temperatures, said capacitors each having a temperature-capacitance characteristic at which the capacitance of the assembly throughout a temperature range exceeding said given range is greater than the peak capacitance of either of said capacitors.

2. A capacitor unit assembly comprising two capacitor sections electrically connected in parallel, each of said capacitor sections comprising a pair of electrodes and a dielectric therebetween consisting of a titanate of an alkaline earth metal exhibiting a perovskite structure, said dielectrics each having different peak-dielectric constant temperatures within a given range of temperatures, said capacitor sections each having a temperature-capacitance characteristic at which the capacitance of the assembly throughout a temperature range exceeding said given range is greater than the peak capacitance of either of said capacitor sections.

3. A capacitor unit assembly comprising two tubular capacitor sections forming a tubular capacitor assembly and electrically connected in parallel, each of said capacitor sections comprising a pair of electrodes and a dielectric therebetween consisting of a titanate of an alkaline earth metal exhibiting a perovskite structure, said dielectrics each having different peak-dielectric constant temperatures within a given range of temperatures, said capacitor sections each having a temperature-capacitance characteristic at which the capacitance of the assembly throughout a temperature range exceeding said given range is greater than the peak capacitance of either of said capacitor sections.

4. A tubular capacitor assembly comprising two capacitor sections electrically connected in parallel, each of said capacitor sections being in the form of a partial tubular section joined to each other to form a tubular assembly, each of said capacitors comprising a pair of electrodes and a dielectric therebetween consisting of a titanate of an alkaline earth metal exhibiting a perovskite structure, said dielectrics each having different peak-dielectric constant temperatures within a given range of temperatures, said capacitor sections each having a temperature-capacitance characteristic at which the capacitance of the assembly throughout a temperature range exceeding said given range is greater than the peak capacitance of either of said capacitor sections.

5. A tubular capacitor assembly comprising two partially tubular capacitor sections electrically connected in parallel, each of said capacitors comprising a pair of electrodes and a dielectric therebetween consisting of mixed crystals of barium-strontium titanate, each of said dielectrics having different peak-dielectric constant temperatures within a given temperature range, said capacitor sections each having a temperature-capacitance characteristic at which the capacitance of the assembly throughout a temperature range exceeding said given range is greater than the peak capacitance of either of said capacitor sections.

ROELOF DIRK BÜGEL.
GERARD HEINRICH JONKER.
JAN HEINRIK VAN SANTEN.

References Cited in the file of this patent

UNITED STATES PATENTS

| Number | Name | Date |
|---|---|---|
| 2,156,056 | Hornung | Apr. 25, 1939 |
| 2,398,088 | Ehlers | Apr. 9, 1946 |
| 2,420,692 | Wainer | May 20, 1947 |
| 2,443,094 | Carlson | June 8, 1948 |

FOREIGN PATENTS

| Number | Country | Date |
|---|---|---|
| 601,109 | Great Britain | Apr. 28, 1948 |

OTHER REFERENCES

"Properties of Barium-Strontium Titanate Dielectrics," by Elmer N. Bunting et al. National Bureau of Standards Research Paper R. P. 1776, vol. 38, March 1947.